(12) United States Patent
Moffa

(10) Patent No.: US 9,600,770 B1
(45) Date of Patent: Mar. 21, 2017

(54) METHOD FOR DETERMINING EXPERTISE OF USERS IN A KNOWLEDGE MANAGEMENT SYSTEM

(71) Applicant: Emergent Systems Corporation, Dearborn, MI (US)

(72) Inventor: Jeffrey A. Moffa, Northville, MI (US)

(73) Assignee: Emergent Systems Corporation, Dearborn, MI (US)

( * ) Notice: Subject to any disclaimer, the term of this patent is extended or adjusted under 35 U.S.C. 154(b) by 383 days.

(21) Appl. No.: 14/179,987

(22) Filed: Feb. 13, 2014

(51) Int. Cl.
*G06N 5/02* (2006.01)

(52) U.S. Cl.
CPC ...................................... *G06N 5/02* (2013.01)

(58) Field of Classification Search
None
See application file for complete search history.

(56) References Cited

U.S. PATENT DOCUMENTS

| | | | |
|---|---|---|---|
| 5,355,445 A | | 10/1994 | Shibao et al. |
| 5,418,951 A | * | 5/1995 | Damashek ............ G06F 17/275 |
| 5,809,493 A | | 9/1998 | Ahamed et al. |
| 6,353,767 B1 | | 3/2002 | Wakeman et al. |
| 6,393,331 B1 | | 5/2002 | Chetta et al. |
| 7,058,472 B2 | | 6/2006 | Mathews et al. |
| 7,158,923 B1 | | 1/2007 | Murthy et al. |
| 7,937,251 B2 | | 5/2011 | Turner et al. |
| 8,204,902 B1 | * | 6/2012 | Dhall .................. G06F 17/3053 707/723 |
| 8,347,236 B1 | | 1/2013 | Moffa |
| 2002/0052808 A1 | | 5/2002 | Sekihata et al. |
| 2005/0071135 A1 | | 3/2005 | Vredenburgh et al. |
| 2005/0091191 A1 | | 4/2005 | Miller et al. |
| 2005/0203718 A1 | | 9/2005 | Carek et al. |
| 2006/0025983 A1 | | 2/2006 | Arbitter et al. |
| 2006/0206462 A1 | | 9/2006 | Barber |
| 2009/0077066 A1 | | 3/2009 | White |
| 2013/0325779 A1 | * | 12/2013 | Shahshahani ............ G06N 5/02 706/46 |

* cited by examiner

*Primary Examiner* — Wilbert L Starks
*Assistant Examiner* — Mai T Tran
(74) *Attorney, Agent, or Firm* — Young Basile Hanlon & MacFarlane P.C.

(57) ABSTRACT

A method includes receiving information identifying a first knowledge element from a plurality of knowledge elements. The method also includes, for a plurality of similar knowledge elements, for each of a plurality of similar knowledge elements determining a first value based on actions taken by a user with respect to a respective knowledge element from the plurality of similar knowledge elements, determining a second value that represents similarity of the first knowledge element to the respective knowledge element, and determining an expertise component value for the respective knowledge element based at least in part on a multiplicative product of the first value and the second value. The method also includes determining an expertise value that represents the user's expertise level relative to a subject matter described by the first knowledge element based on the expertise component values for the plurality of similar knowledge elements.

8 Claims, 3 Drawing Sheets

METHOD FOR DETERMINING EXPERTISE OF USERS IN A KNOWLEDGE MANAGEMENT SYSTEM

BACKGROUND

The disclosure herein relates generally to knowledge management systems.

Although varied in scope and implementation, knowledge management systems generally intend to identify, codify, and distribute knowledge across an organization. Knowledge management systems are typically computer implemented, database driven systems that store discrete elements of knowledge in a computer interpretable format so that the organization's knowledge can be refined and disseminated into various contexts as need arises. Typically, knowledge management systems utilize knowledge elements, such as parametric values, functions, rules, or other data, that control automation of calculations, comparisons, or other tasks. For example, a knowledge management system can be used to automate generation of product documentation, where the documentation is automatically updated when changes are made to the underlying data, such as design standards. Similarly, a knowledge management system can be used to automate or assist certain aspects of product design.

SUMMARY

The disclosure relates to methods for determining expertise of users.

One aspect of the disclosed embodiments is a method that includes receiving, at one or more computing devices, information identifying a first knowledge element from a plurality of knowledge elements. The method also includes identifying, by the one or more computing devices, a plurality of similar knowledge elements. The method also includes identifying, by the one or more computing devices, at least one user associated with one or more knowledge elements from the similar knowledge elements. The method also includes determining, by the one or more computing devices, an expertise value for the at least one user with respect to the first knowledge element. The expertise value is determined based on one or more values representing a strength of a relationship between the user and each of the one or more knowledge elements from the similar knowledge elements and one or more values representing a strength of a relationship between the first knowledge element and each of the similar knowledge elements.

Another aspect of the disclosed embodiments is a method that includes receiving, at one or more computing devices, information identifying a first knowledge element from a plurality of knowledge elements. The method also includes identifying, by the one or more computing devices, a plurality of relationships between a user and the first knowledge element, based on actions taken by the user with respect to one or more similar knowledge elements. The method also includes determining, by the one or more computing devices, an expertise value for the user. The expertise value is determined based on a first value representing actions taken by the user with respect to the one or more similar knowledge elements and a second value representing a degree of similarity between the first knowledge element and each of the one or more similar knowledge elements.

Another aspect of the disclosed embodiments is a method that includes receiving, at one or more computing devices, information identifying a first knowledge element from a plurality of knowledge elements. The method also includes determining a relatedness value for each of a plurality of similar knowledge elements with respect to the first knowledge element, the relatedness value for each of the similar knowledge elements based at least in part on a degree of semantic relatedness of the first knowledge element and the respective similar knowledge element. The method also includes determining, by the one or more computing devices for each of the similar knowledge elements, a user contribution value representing a user's expertise with respect to each of the similar knowledge elements. The method also includes determining, by the one or more computing devices, an expertise value for the user with respect to the first knowledge element. The wherein the expertise value is based on the relatedness value and the user contribution value for each knowledge element from the similar knowledge elements.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for determining expertise of users in a knowledge management system are disclosed herein. In knowledge management systems, expertise of users is codified into a reusable format. The systems and methods described herein allow a user to determine which users have the highest level of expertise with respect to an identified knowledge element. This determination is made by identifying other knowledge elements that are similar to the identified knowledge element. For a given user, expertise with respect to the identified knowledge element is determined as a function of a strength of the relationship of the user with respect to the similar knowledge element and a strength of the relationship of the similar knowledge element with respect to the identified knowledge element, summed over all of the similar knowledge elements with respect to which the user has a relationship. Because the determination is made using information associated with similar knowledge elements, experts in the subject matter described by a knowledge element can be identified when there is no explicit pre-existing relationship between the expert and the knowledge element.

Figure 1:
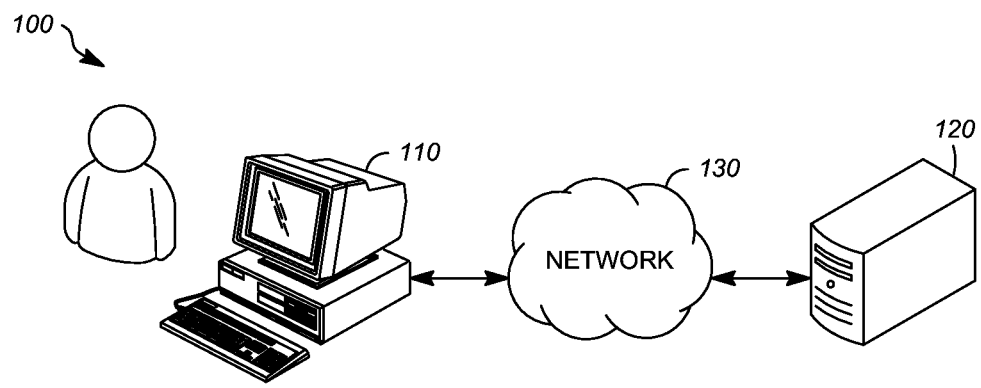
FIG. 1 is a block diagram showing an example of an environment in which a system for determining expertise of users can be implemented.

FIG. 1 shows an example of an environment 100 in which a system for determining expertise of users can be implemented. The environment 100 can include one or more clients 110, and one or more servers 120. The clients 110 are each computing devices of any conventional type, such as, for example, desktop computers, laptop computers, tablet computing devices, or mobile telephones with computing functions (i.e. "smart phones"). Any number of the clients 110 can be included in the environment 100, with each system being able to communicate with the servers 120. The servers 120 can be implemented in any suitable from, including a single computing device or multiple computing devices whether co-located (e.g. a data center) or distributed geographically.

The systems, services, servers, and other computing devices described here are in communication via a network 130. The network 130 can be one or more communications networks of any suitable type in any combination, including wireless networks, wired networks, local area networks, wide area networks, cellular data networks, and the internet.

Figure 2:
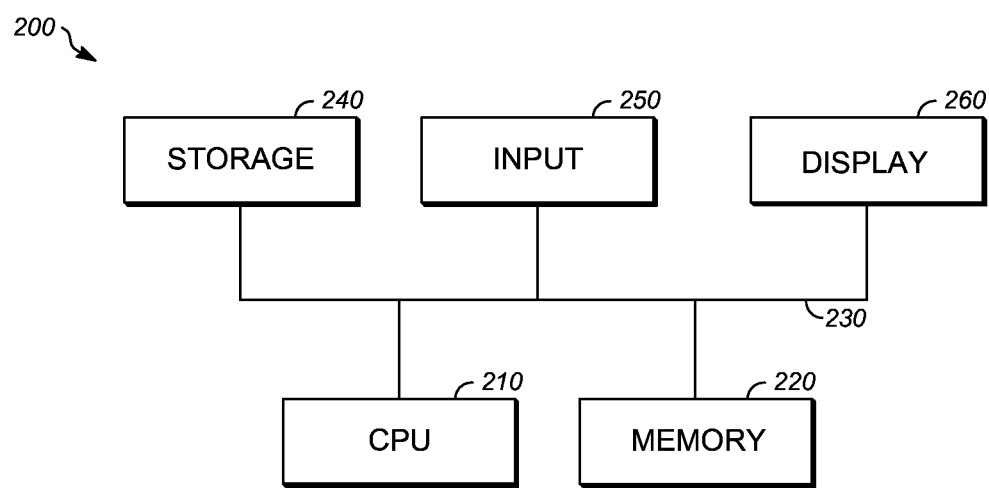
FIG. 2 is a block diagram showing an example of a hardware configuration for a computing device.

FIG. 2 is a block diagram of an example of a hardware configuration for a computing device 200. The hardware configuration described with respect to the computing device 200 can be utilized to implement any of the computing devices described herein, such as the clients 110 and the servers 120. The computing device 200 includes a plurality of components that are interconnected with one another for transmission of signals and data, such as by a bus 210. The computing device 200 includes a CPU 220, which can be a conventional central processing unit, or any other type of device capable of manipulating or processing information. Although a single processor is shown, e.g. CPU 220, multiple processors can be used.

The computing device 200 includes memory 230 in the form of, for example, a random access memory device (RAM). The memory 230 can be utilized for short term storage of data and program instructions for use by the CPU 220 via the bus 210. A storage device 240 can be provided in the form a computer readable media that is usable for long term storage of information such as computer programs and data. Suitable types of devices for use as the storage device 240 include, but are not limited to a hard disc drive, a memory device, a flash drive, or an optical drive. One or more input devices 250, such as any conventional human-machine interface, are operable output signals or data indicative of user inputs, which are provided to the CPU 220 via the bus 210. One or more output devices can be provided, such as a display device 260. The display device 260, such as a liquid crystal display (LCD) or a cathode-ray tube (CRT), allows output to be presented to a user, for example, in response to receiving a video signal.

Figure 3:
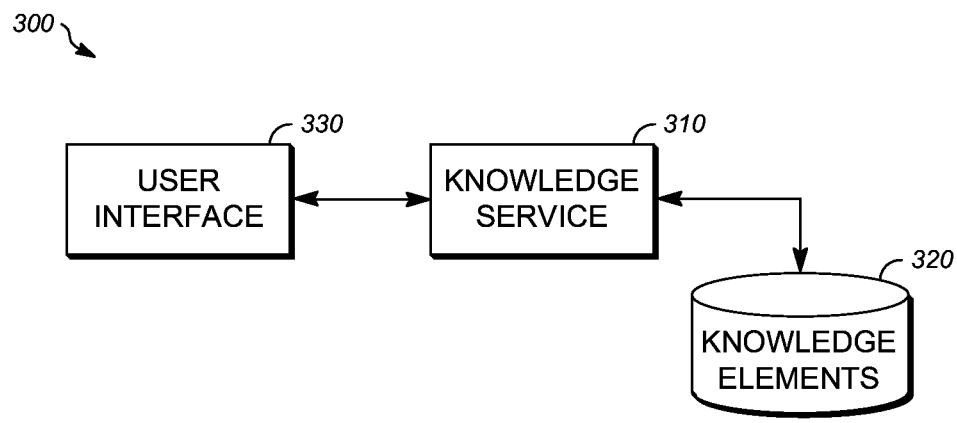
FIG. 3 is a block diagram showing a knowledge management system.

FIG. 3 is a block diagram showing a knowledge management system 300 that is implemented by the servers 120 and can be accessed and used by the clients 110 in a client-server relationship. In alternative implementations, a knowledge management system could be implemented by and used at a single computing device, such as the computing device 200 of FIG. 2.

The knowledge management system 300 includes a knowledge service 310 that can be implemented in the form of program instructions that are executed by the servers 120. The knowledge service 310 is operable to codifying the know-how of an expert into a computer interpretable form, which is referred to herein as a knowledge element 320. Knowledge elements 320 can be stored by the knowledge service 310 using any suitable type of storage media and format.

The knowledge service 310 is operable to perform a number of functions related to creating, maintaining, and facilitating use of the knowledge elements 320. As one example, the knowledge service is operable to receive information from one or more users and store it as a new one of the knowledge elements 320. As another example, the knowledge service 320 is operable to receive information from one or more users and utilize that information to update the information stored in a pre-existing one of the knowledge elements 320. As another example, the knowledge service 310 is operable to receive a request for a specified one of the knowledge elements 320 and provide it to a user, such as by transmission to one of the clients 110. As another example, the knowledge service is operable to receive a search query, such as from one of the clients 110, and identify one or more of the knowledge elements 320 in response to the search query. In another example, the knowledge service 310 is operable to analyze one or more of the knowledge elements 320, generate a result, and transmit the result to one of the clients 110.

The knowledge elements 320 can be utilized in many ways. For example, one of the clients 110 can include document management software that dynamically generates documentation based on user defined criteria in combination with one or more knowledge elements 320, which are retrieved from the knowledge service 310. As another example, one of the clients 110 can be provided with a knowledge-based engineering software package that automates design and/or drafting functions using the information encoded by the knowledge elements 320.

The data encoded within the knowledge elements 320 can vary by application, but will generally include bibliographic information and substantive information. For example, each knowledge element 320 could include a unique identifier, bibliographic information, and substantive information.

The bibliographic information for each knowledge element 320 can identify one or more users that have taken actions with respect to the knowledge element 320. Each of these actions is associated with a specific role. Examples of roles include authoring, editing, reviewing, approving, and/or using the knowledge element 320. Other roles are possible. Thus, if a user edits one of the knowledge elements 320, the knowledge element can be modified to include information that identifies that user as having taken an action with respect to the knowledge element 320, in the role of editor. Information identifying the dates and times on which particular actions occurred can be included in the bibliographic information. Text information describing the knowledge element, such as a description of the knowledge element or title for the knowledge element can also be included in the bibliographic information.

The substantive information stored in each of the knowledge elements 320 represents the know-how that is encoded by each knowledge element 320 in a computer interpretable form. The substantive information can include parametric relationships, attributes, conditional relationships between values, mathematic expressions, text-based information, or similar types of information. As one example, the information can be a rule or a set of rules that correlate input values to output values, where the input values and output values could be values, parameters, or expressions. As another example, the substantive information could describe a complex relationship between an input value and an output value that combines multiple types of the substantive information. In some implementations, a number of the knowledge elements 320 can be programmatically interrelated, interpreted, and applied by the knowledge service 310 for utilization in conjunction with automated problem solving or design applications.

The knowledge elements 320 can be classified as corresponding to particular types or categories, based on the content of the substantive information that is stored in the knowledge element. For example, in a knowledge management system that is used in conjunction with an engineering design project, types of knowledge elements could include issues, standards, rules, expertise profiles, and ideas. These designations are arbitrary, and can be tailored to a particular usage scenario, but allow for organization and grouping of knowledge elements in a logical fashion that can be leveraged in multiple ways, including in determining expertise of users.

The knowledge service 310 is operable to output, for display, a user interface 330 that allows users to interface with the knowledge service 310, such as by storing, modifying, retrieving, viewing, and using the knowledge elements 320. As an example, the user interface 330 can be output by the knowledge service 310 in the form of computer program instructions that, when interpreted, cause the user interface 330 to be displayed at a display device. For example, the user interface can be output for display at one of the clients 110. The user interface 330 can be completely generated by the knowledge service 310, or can be generated in part by additional software executed elsewhere, such as at one of clients 110. For instance, a portion of a user interface, such as a template, can be stored at or generated at the clients 110, and information out by the knowledge service 310, when interpreted by the clients 110 and combined with the portions stored at or generated by the clients 110, causes the user interface 330 to be displayed at the clients 110.

The user interface 330 can be displayed at the clients 110 in a number of different ways. In one implementation, the user interface 330 is part of a web application that is accessed by the clients 110 using web browser software, and is transmitted to the clients 110, for example, in the form of a document including HTML and/or javascript code. In another implementation software is provided at the clients 110, such as standalone software or plug-in software, and the information for causing the user interface 330 to be displayed is transmitted in a suitable data transmission format, such as XML.

The user interface 330 can allow a user to manually browse, search, and/or view the knowledge elements 320. As an example, the user interface 330 can provide search functionality that allows the user to submit a search query to the knowledge service 310. In response to the search query, a search is performed by the knowledge service, such as by keyword searching or semantic analysis searching. Results are then transmitted to the client for display as part of the user interface 330.

Figure 4:
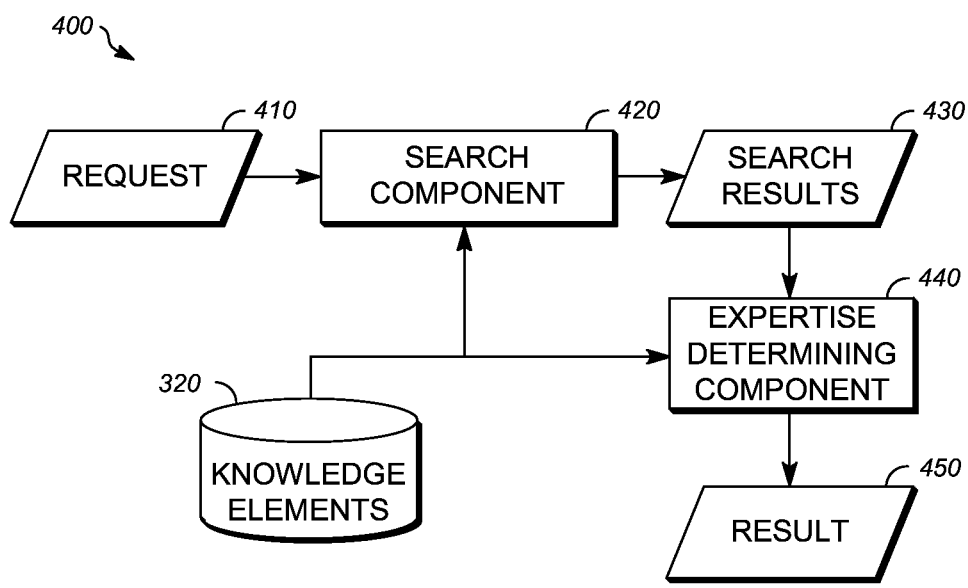
FIG. 4 is a block diagram showing determination of expertise by the knowledge management system.

FIG. 4 is a block diagram showing an example of a system 400 for determination of expertise. The system 400 determines the expertise of one or more users with respect to one or more knowledge elements. Thus for a given knowledge element 320 or subset of the knowledge elements, the system can determine which of the users are most knowledgeable regarding the subject matter of that knowledge element or subset of knowledge elements.

The system 400 can begin operation in response to receiving an input in the form of a request 410. In one example, the request 410 is made at one of the clients 110 and is transmitted to the servers 120 via the user interface 330 provided by the knowledge service 310. The request can include information that identifies a group of one or more of the knowledge elements 320 with respect to which the expertise determination will be made. In one implementation, the request includes information that identifies a single one of the knowledge elements 320. In another implementation, the request includes information that identifies a plurality of the knowledge elements 320. As used herein, "identified knowledge elements" refers to the one or more knowledge elements that are identified by the request 410.

The request 410 is received as an input by a search component 420. The search component 420 can also access the knowledge elements 320. In one implementation, the search component 420 is implemented in the form of computer program instructions that are executed by a processor, such as at the one or more servers 120.

The search component 420 is operable to identify one or more of the knowledge elements 320 based on the request 410, in particular, by identifying a group of one or more of the knowledge elements 320 that are similar to the one or more of the knowledge elements 320 that are identified by the request 410. As used herein, "similar knowledge elements" refers to knowledge elements that are similar to the identified knowledge element, as determined by the search component 420. In one implementation, a knowledge element can be considered similar to the identified knowledge element if it possesses at least a threshold degree of similarity to the identified knowledge element, as determined by, for example, a search function, a ranking function, a semantic analysis function, or any other suitable methods. In another implementation, a number of knowledge elements, such as a predetermined number of knowledge elements or a calculated number of knowledge elements, having a highest degree of similarity to the identified knowledge element are designated as the similar knowledge elements.

In one implementation, the request identifies a single one of the knowledge elements 320. The search component 420 is operable to extract text from the identified knowledge element, such as a text-based description identified knowledge element from the bibliographic information that is associated with the identified knowledge element, or from text contained in the substantive information that is encoded in the knowledge element. The text that is extracted from the identified knowledge element is used as a basis for identifying similar ones of the knowledge elements 320 based on the text contained in those knowledge elements.

A similarity score or rating in any suitable form is generated for each of the similar knowledge elements, representing the degree of similarity between the identified knowledge element and each of the similar knowledge elements. For example, a semantic similarity based search algorithm can be used by the search component 420 to identify the similar knowledge elements based on the text contained in the identified knowledge element, and semantic similarity scores can be generated for each of the similar knowledge elements expressing the degree of semantic similarity or relatedness of each similar knowledge element with respect to the identified knowledge element.

As an output, the search component 420 generates search results 430. The search results 430 include information identifying the one or more similar knowledge elements. The search results 430 can also include information expressing the degree of similarity between the identified knowledge element and each of the similar knowledge elements. In one implementation, the search results 430 are in the form of a list including an identification of one or more similar knowledge elements and a similarity score or rating for each of the one or more similar knowledge elements.

The search results 430 are provided as an input to an expertise determining component 440. The expertise determining component 440 can also access the knowledge elements 320. In one implementation, the expertise determining component 440 is implemented in the form of computer program instructions that are executed by a processor, such as at the one or more servers 120.

The expertise determining component 440 is operable to output an expertise determination, such as in the form of a score, rating, or ranking, numerical or in any other usable form. The score, rating, or ranking can be determined on a user-by-user basis.

The expertise determination is performed for each user that has some type of relationship with the similar knowledge elements that are identified by the search results 430. The expertise determination is based in part on the strength of the relationship between the user and each of one or more similar knowledge elements. The expertise determination is also based in part on the strength of the relationship between each of the similar knowledge elements and the identified knowledge element as expressed, for example, by the similarity score or rating of the search results.

For a given user, a one or more relationships to the similar knowledge element are identified. Each of these relationships is assigned a value, such as a numerical value, that expresses the strength of the relationship of the user with respect to the similar knowledge element, which is referred to herein as a user contribution value, and is indicative of a presumed level of the user's expertise with respect to the similar knowledge element. Each similar knowledge element is also assigned a value, such as a numerical value, that expresses the strength of relationship of the similar knowledge element with respect to the identified knowledge element, which is referred to herein as a relatedness value. Each relationship between the user and one of the similar knowledge elements contributes to the degree of the user's expertise with respect to the identified knowledge element, as a function of the user contribution value and the relatedness value, which can be expressed as an expertise component value. For a given knowledge element, it is conceivable that a given user will have relationships with many of the identified knowledge elements, and an expertise component value is calculated for each relationship. These values are used to determine an expertise value for the user with respect to the identified knowledge element.

The user contribution value represents the strength of the relationship between the user and one of the similar knowledge elements, and thus, the amount of expertise with respect to the similar knowledge element that can be inferred from the user's contributions to that knowledge element. The user contribution value for a knowledge element can be based on the user's role with respect to the knowledge element, as previously discussed. Thus, each role can be assigned a value, and this value can be used as the user contribution value or the user contribution value can be based in part on this value. If a user has multiple roles (e.g. has performed multiple actions) with respect to a knowledge element, each role can be given a separate user contribution value and an expertise component value can be determined for each user contribution value.

The user contribution value can be determined further based in part on bibliographic information associated with the knowledge element, such as metrics describing an extent to which the user contributed. For example, if a user modifies a knowledge element, the strength of the relationship could be defined in part based on the extent of the changes, measure in terms of, for example, words or characters modified. Alternatively, aspects of the bibliographic information associated with each knowledge element can be used to determine the user contribution value without assigning a particular value to a role.

A particular user will likely not have a relationship with all of the similar knowledge elements. In that case, the user contribution value and expertise component value need not be calculated with respect to those knowledge elements. Alternatively, in some implementations, setting the user contribution value to zero will cause the expertise component value for that knowledge element to evaluate to zero, and these values can be calculated and included in the expertise value.

The relatedness value represents the strength of the relationship between the identified knowledge element and a respective one of the similar knowledge elements. In one example, the similarity score or rating that is included in the search results is used as the relatedness value. In another example, the relatedness value is based in part on the similarity score or rating and is based further in part on additional information. The additional information can be based on the bibliographic information for one or both of the similar knowledge element and the identified knowledge element. In one implementation, the bibliographic information describes a type for each knowledge element, and the relatedness value is a function of the similarity score or rating as well as a value based on the type of the similar knowledge element. For instance, each type could be associated with a type value. The type value could be fixed or dependent upon a factor such as the type of the identified knowledge element. As an example, the relatedness value can be determined by multiplying the similarity score or rating by the type value.

For a given relationship between a user and one of the similar knowledge elements, the expertise determining component 440 calculates the expertise component value based on the user contribution value and the relatedness value. In one implementation, the expertise component value for a relationship is computed by multiplying the relatedness value with the user contribution value. The expertise determining component 440 then determines the expertise value for the user with respect to the identified knowledge element by, for example, summing the expertise component values for the user.

In one implementation, the expertise determining component 440 determines an expertise component value for each of a user's roles with respect to each of the similar knowledge elements. For each role, the user contribution value is assigned based on the role. Each role can correspond to a predetermined value for the user contribution value. The relatedness value is based on a predetermined value based on the type of the knowledge element and the similarity score or rating, which are multiplied to determine the relatedness value. The relatedness value and the user contribution value are multiplied to determine the expertise component value. Thus, in this example, the expertise component value is a multiplicative product of the similarity score or rating, the type value for the similar knowledge element, and the role value corresponding to the user's role with respect to the similar knowledge element.

The expertise determining component 440, after determining the expertise value for some or all of the users that are related to the similar knowledge elements, outputs the expertise values as a result 450. The result 450 can be, as one example, a list identifying one or more users in association with their respective expertise values. As another example, the result 450 can be information identifying the user having the highest expertise value. As another example, the result 450 can be a rank-ordered list of a plurality of users, such as a predetermined number of users, with or without their expertise values. As another example, the result 450 can be a list of users having an expertise value above a threshold value. As another example, the result 450 can be a list of users including the user having the highest expertise value and zero or more additional users having expertise values within a range based on the highest expertise value, such as users having an expertise value of at least 80% of the highest expertise value.

Figure 5:
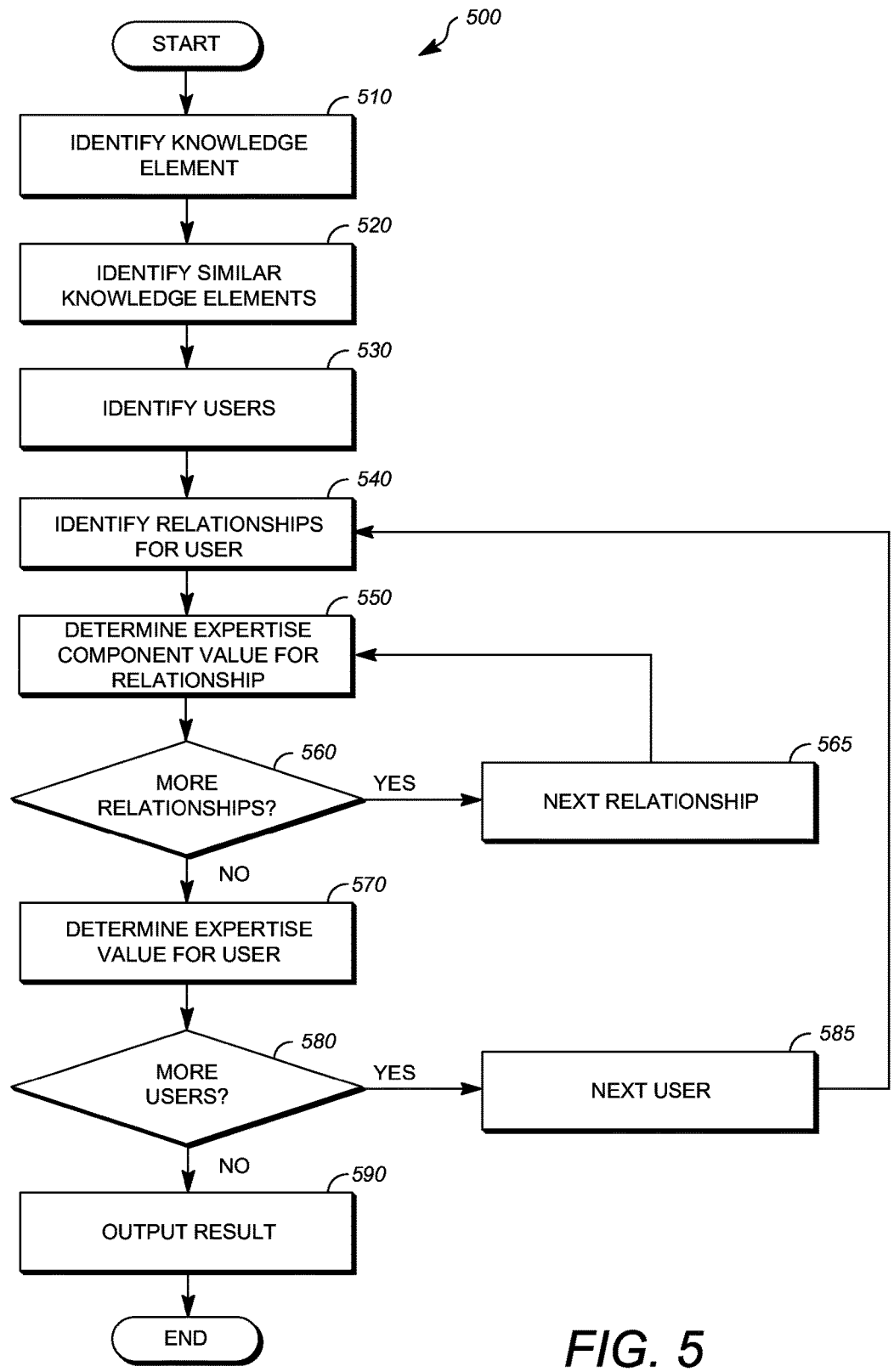
FIG. 5 is a flowchart showing an example of a process for determining expertise of users in the knowledge management system.

FIG. 5 is a flowchart showing an example of a process for determining expertise of users in the knowledge management system. The operations described in connection with the process 500 can be performed at one or more computers, such as at the servers 120. When an operation is performed by one or more computers, it is completed when it is performed by one computer. The operations described in connection with the process 500 can be embodied as a non-transitory computer readable storage medium including program instructions executable by one or more processors that, when executed, cause the one or more processors to perform the operations. For example, the servers 120 can each include a memory and a CPU, such as in the hardware configuration described with respect to the computing device 200, and the operations described in connection with the process 700 can be stored at the memory of the servers 120 and be executable by the CPU of the servers 120.

In operation 510, a knowledge element is identified. For example, information can be received that identifies one of the knowledge elements 320. In one example, the information can be a user input. Operation 510 can be performed as described with respect to the request 410 and the search component 420.

In operation 520, similar knowledge elements are identified. In one example, similar knowledge elements are identified by a semantic search using text extracted from the knowledge element identified in operation 510, and a similarity score can be generated for each of the similar knowledge elements, as described with respect to the search component 420 and the search results 430.

In operation 530, one or more users are identified based on the similar knowledge elements that were identified in operation 520. The users identified in operation 530 can be users that have a relationship of some type (e.g. performed an action at a previous time) with one or more of the similar knowledge elements.

In operation 540 relationships are identified for a selected user from the users identified at operation 530. A first user is selected for the first iteration of operation 540, and a different user is selected for each subsequent iteration of operation 540. The relationships identified at operation 540 are relationships between the selected user and the similar knowledge elements, as described with respect to the expertise determining component 440.

In operation 550 an expertise component value is determined for a selected relationship between the selected user and one of the similar knowledge elements. A first relationship is selected for the first iteration of operation 550, and a different relationship is selected for subsequent iterations. The expertise component value can be determined, for example, as described with respect to the expertise determining component 440.

At operation 560, a determination is made as to whether more relationships to the similar knowledge elements exist for the currently selected user. If more relationships exist, the next relationship is selected at operation 565 and the process returns to operation 550. Otherwise, the process continues to operation 570.

At operation 570, the expertise value for the currently selected user is determined. This determination can be made, for example, in the manner described with respect to the expertise determining component 440.

At operation 580, a determination is made as to whether more users that were identified at operation 530 exist for whom an expertise value has not yet been calculated. If more users exist, the next user is selected at operation 585 and the process returns to operation 540. Otherwise, the process continues to operation 590.

At operation 590, a result is output. The result can include the expertise values that were calculated at operation 570 for each of the users that were identified at operation 530. Furthermore, the result can be output as described with respect to the result 450.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer. In one implementation, an apparatus includes a processor and computer readable storage device. Computer program instructions are stored on the computer readable storage device. The program instructions, when executed by the processor, cause the processor to perform operations, such as any or all of the operations described with respect to FIGS. 3-5.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
    receiving, at one or more computing devices, information identifying a first knowledge element from a plurality of knowledge elements;
    for each of a plurality of similar knowledge elements:
        determining, by the one or more computing devices, a first value based on actions taken by a user with respect to a respective knowledge element from the plurality of similar knowledge elements,
        determining a second value that represents similarity of the first knowledge element to the respective knowledge element, and
        determining an expertise component value for the respective knowledge element based at least in part on a multiplicative product of the first value and the second value; and
    determining, by the one or more computing devices, an expertise value that represents the user's expertise level relative to a subject matter described by the first knowledge element based on the expertise component values for the plurality of similar knowledge elements.

2. The method of claim 1, wherein the knowledge elements include information encoded in a computer-interpretable form.

3. The method of claim 1, wherein the knowledge elements include substantive data and bibliographic data.

4. The method of claim 1, wherein the knowledge elements include bibliographic data, and determining the first value is performed using the bibliographic data from the similar knowledge elements.

5. The method of claim 4, wherein the bibliographic data for at least some of the similar knowledge elements includes information identifying the user.

6. The method of claim 1, further comprising:
 identifying the similar knowledge elements based on a degree of similarity of the similar knowledge elements to the first knowledge element.

7. The method of claim 6, wherein the degree of similarity of the similar knowledge elements to the first knowledge element is determined using a semantic analysis function.

8. The method of claim 1, wherein a degree of similarity of the similar knowledge elements to the first knowledge element is determined by comparing text from the first knowledge element to text from each of the similar knowledge elements.

* * * * *